(12) United States Patent
Jürgens

(10) Patent No.: US 9,566,964 B2
(45) Date of Patent: Feb. 14, 2017

(54) BRAKE DEVICE HAVING A TRAVEL SENSOR FOR INTEGRATED MOTOR VEHICLE BRAKE SYSTEMS

(71) Applicant: Continental Teves AG & Co. oHG, Frankfurt (DE)

(72) Inventor: Michael Jürgens, Wölfersheim (DE)

(73) Assignee: Continental Teves AG & Co. oHG, Frankfurt (DE)

(*) Notice: Subject to any disclaimer, the term of this patent is extended or adjusted under 35 U.S.C. 154(b) by 8 days.

(21) Appl. No.: 14/767,319

(22) PCT Filed: Feb. 11, 2014

(86) PCT No.: PCT/EP2014/052608
§ 371 (c)(1),
(2) Date: Aug. 12, 2015

(87) PCT Pub. No.: WO2014/124925
PCT Pub. Date: Aug. 21, 2014

(65) Prior Publication Data
US 2016/0016567 A1    Jan. 21, 2016

(30) Foreign Application Priority Data
Feb. 13, 2013    (DE) ........................ 10 2013 202 350

(51) Int. Cl.
*B60T 7/04*    (2006.01)
*B60T 8/36*    (2006.01)
*B60T 8/40*    (2006.01)

(52) U.S. Cl.
CPC ................ *B60T 8/368* (2013.01); *B60T 7/042* (2013.01); *B60T 8/4086* (2013.01); *B60T 8/4072* (2013.01); *B60T 2220/04* (2013.01)

(58) Field of Classification Search
CPC ........ B60T 7/042; B60T 8/3675; B60T 8/368; B60T 8/4072; B60T 8/4077; B60T 8/4081; B60T 8/4086; B60T 2220/04
(Continued)

(56) References Cited

U.S. PATENT DOCUMENTS

| | | | |
|---|---|---|---|
| 5,301,617 A | 4/1994 | Miwa | |
| 5,443,306 A | 8/1995 | Broome | |
| 8,207,729 B2 | 6/2012 | Erickson | |
| 8,287,054 B2* | 10/2012 | Beer | ........................ B60T 8/368 303/10 |
| 8,371,661 B2 | 2/2013 | Leiber | |
| 8,392,085 B2 | 3/2013 | Schonlau | |
| 8,424,976 B2* | 4/2013 | Dinkel | ..................... B60T 7/042 188/359 |
| 9,061,666 B2* | 6/2015 | Iyatani | ..................... B60T 8/368 |
| 9,446,753 B2* | 9/2016 | Feigel | ..................... B60T 7/042 |
| 2011/0062775 A1* | 3/2011 | Iyatani | ..................... B60T 8/368 303/20 |

(Continued)

FOREIGN PATENT DOCUMENTS

| | | |
|---|---|---|
| DE | 4004065 | 8/1991 |
| DE | 69309173 | 7/1997 |

(Continued)

OTHER PUBLICATIONS

German Search Report for German Application No. 10 2013 202 350.2 mailed Sep. 18, 2013, including partial translation.

(Continued)

*Primary Examiner* — Thomas Irvin
(74) *Attorney, Agent, or Firm* — RatnerPrestia

(57) ABSTRACT

A braking device including a travel sensor, which consists of a movable travel indicator and a sensing device for detecting a displacement or position in an actuation direction, wherein the braking device is structurally combined as a compact unit including a housed electronic control unit, a hydraulic unit, and in particular a pump unit, wherein the sensing device is integrated on or in the housed electronic control unit and the sensing device is arranged directly or indirectly on a circuit board, wherein the circuit board is either a main circuit board of the electrohydraulic device or an additional auxiliary circuit board connected to the main circuit board electrically and in particular also mechanically.

11 Claims, 3 Drawing Sheets

(58) Field of Classification Search
USPC ........ 303/3, 10, 20, 115.2, 115.1, 113.4, 155
See application file for complete search history.

(56) References Cited

U.S. PATENT DOCUMENTS

| | | | | |
|---|---|---|---|---|
| 2011/0115282 A1* | 5/2011 | Dinkel | .................... | B60T 7/042 |
| | | | | 303/3 |
| 2014/0203626 A1* | 7/2014 | Biller | .................... | B60T 8/4081 |
| | | | | 303/10 |
| 2014/0298785 A1 | 10/2014 | Muller | | |
| 2016/0264113 A1* | 9/2016 | Feigel | .................... | B60T 8/326 |

FOREIGN PATENT DOCUMENTS

| | | |
|---|---|---|
| DE | 10010042 | 7/2001 |
| DE | 102004058875 | 8/2005 |
| DE | 102005018649 | 10/2006 |
| DE | 102008062864 | 11/2009 |
| DE | 102009033499 | 1/2010 |
| DE | 102010040720 | 3/2012 |
| DE | 102010045617 | 3/2012 |
| DE | 102011081463 | 3/2012 |
| DE | 102012212141 | 1/2013 |
| DE | 102011085730 | 5/2013 |
| WO | 2013064651 | 5/2013 |

OTHER PUBLICATIONS

International Search Report for International Application No. PCT/EP2014/052608 mailed Apr. 9, 2014.

\* cited by examiner

BRAKE DEVICE HAVING A TRAVEL SENSOR FOR INTEGRATED MOTOR VEHICLE BRAKE SYSTEMS

CROSS REFERENCE TO RELATED APPLICATIONS

This application is the U.S. National Phase Application of PCT/EP2014/052608, filed Feb. 11, 2014, which claims priority to German Patent Application No. 10 2013 202 350.2, filed Feb. 13, 2013, the contents of such applications being incorporated by reference herein.

FIELD OF THE INVENTION

The invention relates to a travel sensor composed of a movable travel signal generator and a measuring pickup in an electrohydraulic device.

BACKGROUND OF THE INVENTION

The significant part of the electrohydraulic brake devices which are used today in series production in motor vehicles is still composed at least of an activation boost apparatus (booster) with a usually hydraulic or pneumatic brake boosting means and a compact electrohydraulic pressure open-loop or closed-loop control assembly (HECU) which is arranged separately therefrom.

Electrohydraulic brake control devices with travel sensors for sensing the activation travel of a brake rod, in which the travel sensor is arranged structurally separate from, or at least on the outside of, the housing of the electronic control unit (ECU), have already become known. Corresponding arrangements with the travel sensor system are known, for example, by the term hydraulic "brake-by-wire" brake. A travel sensor arrangement suitable for this can be found, for example, in DE 100 10 042 A1, which is incorporated by reference.

DE 10 2004 058 875 A1, which is incorporated by reference, also describes a travel sensor which operates in a contactless fashion for an electrohydraulic brake which operates according to the Hall principle. The sensor magnet is directly positioned on the piston. The actual measuring pickup of the travel sensor is arranged outside on the housing of the pressure-generating unit or pressure-boosting unit.

The brake devices described above have spatial separation of the pressure-generating or -boosting device (booster) from the pressure open-loop or closed-loop control unit. This is also the case in a "brake-by-wire" brake where the pedal module together with a pedal sensation simulator is also separate from the actual brake pressure control device. To an increasing degree, there are now efforts also to include, in relatively large parts of the series, brake devices which overcome the spatial separation of the activation and open-loop or closed-loop control of the pressure by combining the electrohydraulic components to form one combined assembly. Even if such arrangements have already become known per se, there is still the possibility of making further improvements with respect to the requirements of the automobile industry in terms of flexibility, braking power and comfort while complying with the manufacturing budget which is available for it.

SUMMARY OF THE INVENTION

An aspect of the present invention is therefore concerned, inter alia, with the problem of the design of a travel sensor which operates reliably and with high accuracy, for a brake device which is intended to have an even further enhanced more compact design and furthermore can be fabricated cost-effectively in series.

An aspect of the invention is a brake device having a travel sensor which is composed of a movable travel signal generator and a measuring pickup for sensing a movement or position in the activation direction, wherein the brake device is structurally combined as a compact assembly composed of a housed electronic control unit, a hydraulic unit and, in particular, a pump assembly, with the particular feature that the measuring pickup is integrated onto or into the housed electronic control unit, and the measuring pickup is arranged directly or indirectly on a printed circuit board, wherein the printed circuit board is either a main printed circuit board of the electrohydraulic device or an additional auxiliary printed circuit board which is connected to the main printed circuit board electrically and, in particular, also mechanically.

The measuring pickup is therefore integrated onto or into the housed electronic control unit. This is to be understood as meaning that the measuring pickup is connected directly to the electronic control unit without an additional housing being required for the measuring pickup, and that the housing of the control unit performs the sealing of the measuring pickup and of possibly present evaluation electronics of the sensor with respect to the intensive environmental influences which are present in a motor vehicle and which are caused, for example, by moisture, heat, dust and mechanical vibrations.

The above design of a brake device has an entire series of advantages. One advantage is that, by integrating the measuring pickup and arranging it on the printed circuit board, low-ohmage contacts are produced with significantly shorter signal line lengths between the sensor and the electronics for the processing of the sensor signals.

The travel sensor preferably operates according to an inductive principle, wherein, in particular, according to this principle a change in the field of an electrical transformer, arranged in the measuring pickup, for determining the travel is caused by the movement of the travel signal generator. The use of an inductive principle results in a particularly simple design of the travel pickup. A travel signal which is comparatively precise in terms of location can be made available using the transformer technology, for example in conjunction with digital signal processing which is to be expediently used.

The measuring pickup is preferably arranged on a printed circuit board, wherein the printed circuit board is either a main printed circuit board of the electrohydraulic device or an additional auxiliary printed circuit board which is connected to the main printed circuit board electrically and, in particular, also mechanically. There may also be a framework of printed circuit boards here which are connected to one another mechanically and, in particular, also electrically. This can then be advantageous if the overall height of the measuring pickup has to be adapted with respect to the distance from the measuring signal generator for structural reasons. However, structural solutions which permit direct attachment of the measuring pickup to the main circuit board are to be preferred for reasons of cost.

In this context, the measuring pickup is expediently located together with any signal processing which may be necessary on the printed circuit board (auxiliary printed circuit board or main printed circuit board).

In principle any component which generates or influences a magnetic field, such as, for example, a magnet or an electrical coil, can be used as a travel signal generator. The travel signal generator is, however, preferably a permanent magnet of any desired shape which, through mechanical coupling to the brake rod, is moved in accordance with the activation travel of the brake activation means along the measuring pickup. The permanent magnet is particularly preferably cylindrical in shape so that it can terminate flush with the surface of a cylindrical push rod.

The electrohydraulic device preferably has an apparatus for hydraulic boosting, which apparatus is based, in particular, on the principle of a motor-operated electromechanical hydraulic pump arrangement. According to one preferred embodiment, the pump of this pump arrangement comprises a plunger for generating hydraulic pressure, which plunger is driven by a highly dynamic electric motor.

According to a further preferred embodiment, the measuring pickup or a part thereof projects into the free space of a cutout on the hydraulic unit. In other words, the measuring pickup protrudes beyond the surface boundary of the open edge (the lower edge in FIG. 3) of the electronics unit, which edge is connected to the hydraulic unit, as a result of which the measuring pickup is closed off in a water-tight fashion together with the valve coils and the electronics by the housing of the electronics unit. Although it is possible that in this context the protruding part of the measuring pickup is entirely or partially enclosed by a protruding part of the housing of the control unit, this is not necessary since connecting the electronic housing to the hydraulic unit eliminates the need for additional closing off of the sensor. Owing to the saving in terms of electronic connections, additional housing parts and attachment means which are otherwise necessary therefor, a significant advantage is obtained in this way over brake control arrangements in which the travel pickup is arranged in a separate housing.

According to a further preferred embodiment, the activation direction of the travel sensor is arranged perpendicularly with respect to the piston axis of the plunger. As a result, a further reduction in the structural volume of the entire brake assembly can be achieved. A particularly preferred development is that the assembly is constructed in such a way that the housing of the pump passes entirely or partially through the electronics housing. In this way, the volume of the installation space required for the entire assembly in the motor vehicle can be reduced even further. For this purpose, in particular, the housing and/or the main printed circuit board have/has a through-opening.

The material of the magnetic core can be embodied in a single layer or else in multiple layers. The measuring pickup of the travel sensor preferably contains a magnetic core made of a layered material, wherein the layered material is embodied in particular as a film stack or a film packet of the magnetic core material. The core material is composed, in particular, of a soft-magnetic material. Through a suitable design of the magnetic core of the measuring pickup it is possible to make the sensor sufficiently insensitive to electromagnetic interferences which are of particularly high intensity in a brake control assembly which contains an electrically driven pump and a multiplicity of magnet coils, particularly as a result of the structural proximity caused by the integration. In conjunction with the integration of the travel sensor into the brake device and the resulting relatively short signal line paths, overall a travel sensor system is obtained which is significantly less sensitive to electromagnetic interferences and also has improved spatial resolution and dynamics.

A simple and advantageous way of manufacturing the measuring pickup is obtained by virtue of the arrangement of the magnetic core on or in a wire carrier (lead frame), a printed circuit board or some other substrate.

According to one development of the invention, the measuring pickup is what is referred to as a linear travel sensor (LIPS) which operates according to the differential transformer principle which is known per se. The functional principle is similar to a transformer with a primary and secondary coil, in which the inductance of the transformer core and therefore the transmission are changed. If an electrical alternating voltage signal is applied to the primary coil, the current induces an identical output signal in the secondary coils via the magnetic core of the sensor, provided there is no position encoder magnet in the vicinity. If the position encoder magnet which is entrained by the push rod now approaches the secondary coil, it drives the magnetic core into saturation. This gives rise to a changed transmission behavior of the electrical alternating voltage signal between the primary coil and the corresponding secondary coil, which the encoder magnet has approached, which can be evaluated in a manner known to a person skilled in the art by means of the sensor circuit. In this way, the position of the encoder magnet can be sensed with the measuring pickup.

Two secondary coils, which are, in particular, structurally identical, are preferably used in the measuring pickup, and this is advantageous for the signal quality and precision of the evaluation.

In order to accommodate the coils, the measuring pickup is expediently divided into a plurality of winding regions which are then wound with the corresponding electrically isolated coil wires. In this context, the primary coil is particularly preferably wound over all the winding regions, while the one or more secondary coils is/are merely wound in partial regions.

According to a further preferred embodiment of the specified sensor, the measuring pickup is an electrical transformer, in particular a linear, inductive position sensor, referred to as LIPS, which is configured to transmit at least one reference signal as an encoder signal as a function of a position of the encoder element. The transmitter can be the abovementioned electrical component which converts the magnetic flux. Within the scope of the specified sensor, a transformer is to be understood as meaning an electrical component which has two coils which are electrically isolated from one another and which transmit electrical energy to one another via a common contact medium such as air or the abovementioned magnetic core. If the encoder element is, for example, itself a magnet, then it changes the transmission properties of the common contact medium, which is apparent from a changed transmission behavior of the two coils. In the case of an LIPS, the scope of the specified sensor is intended to be a transformer which has a third coil, wherein the second and third coils are arranged so as to exchange electrical energy with the first coil. Depending on the position of the encoder element which is embodied as a magnet with respect to the second and third coils, a specific configuration of the transmission ratios between the first and second and the first and third coils is obtained. Since the position of the encoder element is now sensed with two different transmission ratios at two different locations, the abovementioned saturation of the magnetic core can also be used for the sensing of the positions.

If the coils in the transformer are wound onto a magnetic core using a coil former, the magnetic core has, in one preferred development, an expansion co-efficient which is in the region of an expansion co-efficient of the coil former. In this way, the coil former can be applied directly to the magnetic core, for example by encapsulation with injection molding using a duroplast, without mechanical stresses being input onto the magnetic core and therefore falsifying the measuring result with the transformer. Otherwise, these inputs of mechanical stresses would have to be avoided by supporting the magnetic core in an elastic material within the coil former.

Soft-magnetic materials such as, for example, iron-nickel magnets with and without freedom from magneto-striction can be selected as the magnetic core. Magnetostriction is to be understood below as meaning the change in magnetic characteristic variables such as magnetic field strength, magnetic flux density or magnetic permeability as a result of mechanical loading such as pressure or tensile stress. As a result of the stress-free insertion of the magnetic core into the cutout it is possible to avoid magnetostriction.

The travel sensor arrangement is preferably of redundant design and preferably has two first secondary coils and two second secondary coils which are connected to the signal processing unit or to one signal processing unit each.

Preferably separate digital signal processing electronics are arranged within the travel pickup or in spatial proximity of the travel pickup, with which signal processing electronics the travel sensor signal can be made available. For complex signal evaluation, the signal processing electronics expediently comprise a microcontroller for the calculation tasks.

The digital signal processing electronics particularly preferably sense at least one electrical variable of the two secondary coils and therefore determine the position and/or deflection. The signal processing unit particularly preferably comprises for this purpose at least one Goertzel filter, described in more detail below, for frequency-selective calculation of the amplitudes.

A Goertzel filter or Goertzel algorithm is understood to mean a 1-point discrete Fourier transformation, according to a defined algorithm, which supplies the amplitude of the fed-in signal as a result. The phase information can, in particular, be eliminated. In contrast to the FFT, fast-Fourier Transformation, the Goertzel algorithm can always be appropriately used if a known discrete frequency is to be evaluated. This is the case in the travel sensor arrangement. In particular steep-edged, frequency-selective amplitude calculation can then also be carried out on simple, economical microcomputers. The travel sensor arrangement then comprises at least one primary coil, at least a first and a second secondary coil, and at least one soft-magnetic coupling element (magnetic core) which magnetically couples the primary coil and the two secondary coils, wherein the travel sensor is embodied in such a way that a position and/or deflection are/is sensed as a function of the magnetic coupling between the primary coils and at least the first and second secondary coils, wherein the travel sensor arrangement comprises a signal processing unit.

BRIEF DESCRIPTION OF THE DRAWINGS

Further preferred embodiments can be found in the dependent claims and the following description of an exemplary embodiment with reference to figures.

DETAILED DESCRIPTION OF THE INVENTION

Figure 1:
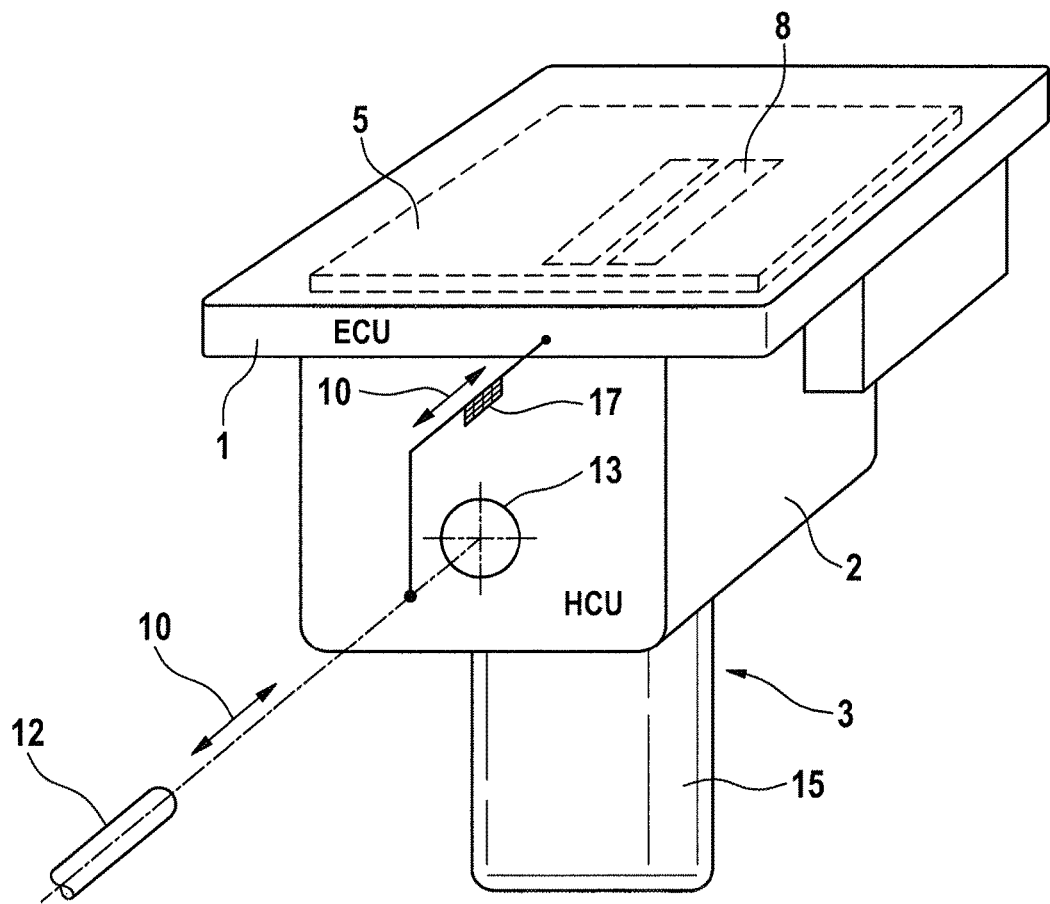
FIG. 1 shows an exemplary embodiment of the invention in a schematic illustration.

In FIG. 1, only a number of the assemblies which are relevant for the invention are illustrated. The electronic control unit (ECU) 1 is combined with a hydraulic block (HCU) 2 and a pump assembly 3 to form a common brake assembly.

The travel sensor 4 is composed of a measuring pickup 8 and travel signal generator 17. The travel signal generator 17 is, for example, a permanent magnet 23 (FIG. 4) which is moved in the activation direction 10 by means of a mechanical connection to an activation device (pedal rod 12 which is guided by the guide 13). The travel signal generator 17 therefore generates the travel-dependent magnetic field which is to be sensed, and which is sensed by the measuring pickup 8.

Figure 2:
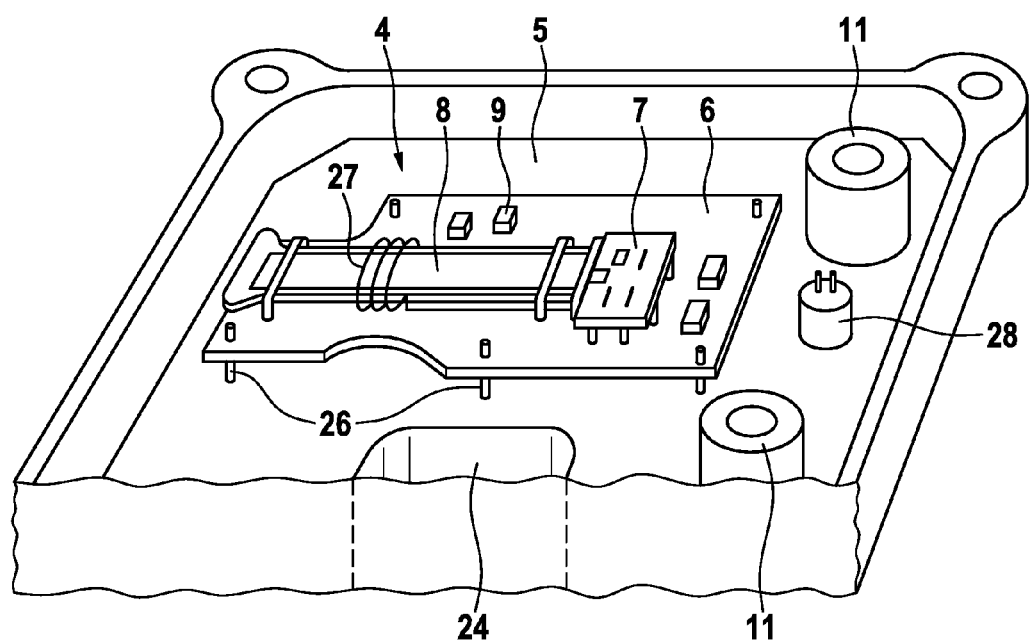
FIG. 2 shows the integration of a travel pickup into the electronics housing.
Figure 3:
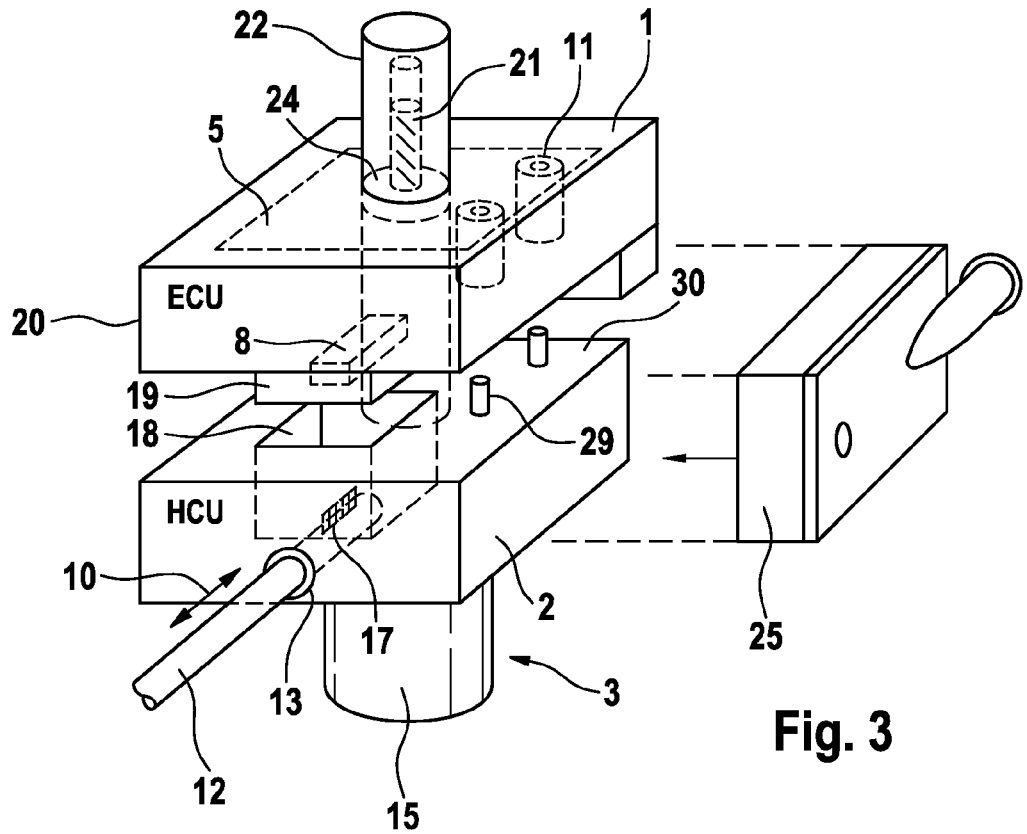
FIG. 3 shows an entire assembly for an electrohydraulic brake with a travel pickup which is seated in a depression.

In FIG. 2, the electronic control unit 1 is illustrated from the open side. In the volume region which is enclosed by the housing 20, the components which are customary for an electrohydraulic pressure control assembly, such as, for example, a main printed circuit board 5, valve coils 11 and pressure sensors 28, are arranged. The valve coils 11 serve to actuate valve domes 29 (FIG. 3).

In contrast to the exemplary embodiment in FIG. 1, the measuring pickup 8 is arranged on an auxiliary printed circuit board 6. The auxiliary printed circuit board 6 is connected mechanically, and depending on the connection also additionally electrically, to the main printed circuit board 5 by means of press-in pins 26. An electronic signal pre-processing circuit with active and/or passive electrical components 9 is preferably arranged directly on the auxiliary printed circuit board 6.

In the illustrated exemplary embodiment, the measuring pickup 8 itself is attached to a small carrier printed circuit board 7. Such a carrier board is not necessarily provided if the measuring pickup can also be attached directly to the auxiliary printed circuit board 6 or the main printed circuit board 5 in series production.

The travel sensor 4 can have the form of an arrangement composed of a sensor printed circuit board 7 which is connected electrically and, in particular, mechanically to the main printed circuit board 5 or auxiliary printed circuit board 6, and a measuring pickup 8. The measuring pickup 8 may be any desired travel-sensing magnetic-field-dependent measuring converter which is known per se for converting the position of a magnetic field into an electrical signal. In the illustrated example the measuring pickup 8 is formed, for example, by a ferrite core around which an electrical coil 27 is wound. The arrangement of the coil in the figure is only to be understood as exemplary. In the case of a differential coil converter, two or more electrically isolated coil windings are then present. The measuring pickup can expediently be embodied as a housed electronic sensor component, for example with a plastic housing formed by encapsulation by injection molding. A housed measuring pickup is used to simplify the electronic fabrication, for example in the form of an SMD-solderable electronic component. The component described above can, if it is expedient, also be present repeatedly, for example arranged in the direction of the movement axis of the sensor.

In the case of a direct arrangement of the measuring pickup 8 on the main printed circuit board 7, a particularly compact design is obtained which gives rise to an even greater reduction in the size of the entire assembly composed of the travel sensor and brake device. The signal quality of the sensor can in this way be improved even further, which can be attributed to the elimination of transfer resistances of the contact points and overall shorter signal lines. In order to improve the accuracy, it has proved expedient to arrange the electronics 9 for processing the sensor signal, which is performed, in particular, in a mainly digital fashion, in the direct spatial vicinity of the measuring pickup. It is then particularly expedient to encapsulate the measuring pickup and the electronics 9 for the signal processing jointly by injection molding.

The integrated electromechanical arrangement for boosting the braking request is preferably assembled on a highly dynamic electric motor 15 and a pump 16, wherein the pump preferably operates according to the hydraulic pressure with a plunger 21 nowadays is installed in motor vehicles in series use generates.

Figure 4:
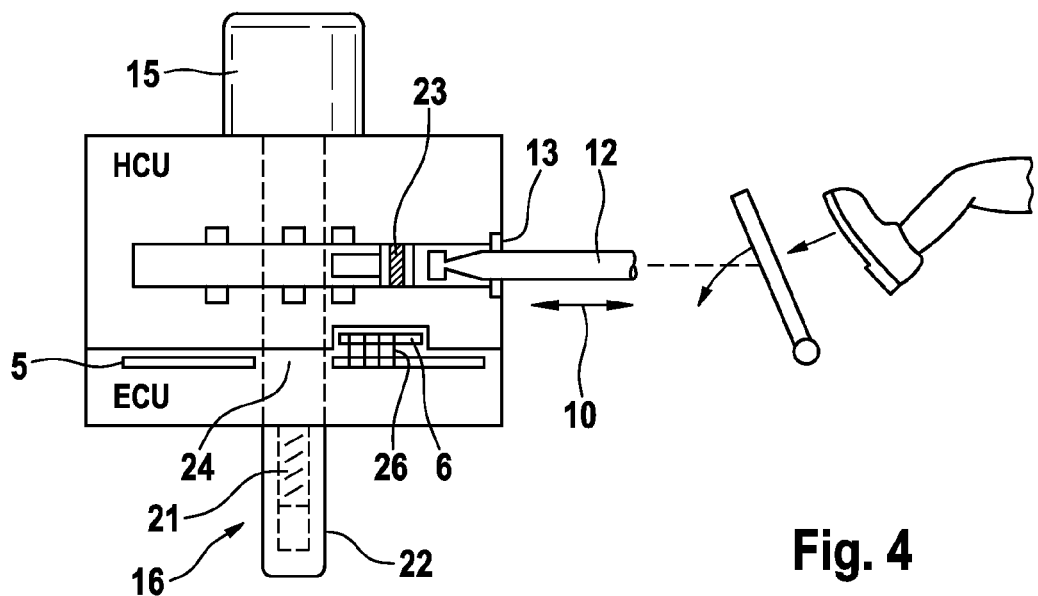
FIG. 4 shows the entire assembly according to FIG. 3 in section.

FIG. 3 and FIG. 4 illustrate that the measuring pickup 8 is entirely or partially enclosed by a protruding part 19 of the housing 2 of the control unit 1. Said protruding part 19 projects into the free space of a cutout 18 on the hydraulic unit 2.

According to a further reversed exemplary embodiment (not illustrated), the travel signal generator 17 projects beyond one of the outer, largely planar surfaces 30, and thus sits within the volume enclosed by the housing 20 of the electronic control unit 1.

The housing 22 of the pump 3 passes entirely or partially through the electronics housing 1, wherein for this purpose, in particular, the housing 2 and/or the main printed circuit board have/has a through-opening 24. Since, according to an alternative embodiment, it is possible to embody the main printed circuit board 5 repeatedly in a sandwich-like manner, the result is that, depending on the spatial extent thereof, the through-opening 24 is then necessary in each of these printed circuit boards.

A brake fluid container 25 is provided on a largely planar side of the hydraulic unit through which neither the plunger axle nor the pedal axle 12 passes, which also results in the overall spatial orientation of the assembly in the vehicle. This arrangement results in a particularly compact structural design of the entire assembly for a highly integrated electrohydraulic brake system in which the spatial separation of the generation of the brake pressure or boosting of the brake pressure and the brake pressure control is eliminated. This permits the brake assembly to be arranged in the engine cavity of a motor vehicle, directly in the region of the exit of the pedal axle.

In FIG. 4, the travel signal generator 17 is embodied as a cylindrical permanent magnet 23 which is moved in the direction 10 through the activation of the pedal by a driver and a pedal rod 12 connected thereto.

The invention claimed is:

1. A brake device having a travel sensor which is composed of a movable travel signal generator and a measuring pickup for sensing a movement or position in an activation direction, wherein the brake device is structurally combined as a compact assembly composed of an electronic control unit and a hydraulic unit, wherein
   the electronic control unit is provided within an electronic control unit housing and the hydraulic unit is provided within a hydraulic unit housing separate from the electronic control unit housing,
   the measuring pickup is integrated onto or into the electronic control unit housing, and
   the measuring pickup is arranged directly or indirectly on a printed circuit board, wherein the printed circuit board is either a main printed circuit board of the brake device or an additional auxiliary printed circuit board which is connected to the main printed circuit board electrically and also mechanically.

2. The brake device as claimed in claim 1, wherein the travel sensor operates according to an inductive principle, wherein a change in the field of an electrical transformer, arranged in the measuring pickup, for determining the travel is caused by the movement of the travel signal generator.

3. The brake device as claimed in claim 2, wherein the electrohydraulic device has an apparatus for hydraulic boosting, which apparatus is based on the principle of a motor-operated electromechanical hydraulic pump arrangement.

4. The brake device as claimed in claim 1, wherein the electrohydraulic device has an apparatus for hydraulic boosting, which apparatus is based on the principle of a motor-operated electromechanical hydraulic pump arrangement.

5. The brake device as claimed in claim 4, wherein a pump of the pump arrangement comprises a plunger for generating hydraulic pressure, which plunger is driven by an electric motor.

6. The brake device as claimed in claim 5, wherein the activation direction of the travel sensor is arranged perpendicularly with respect to a piston axis of the plunger.

7. The brake device as claimed in claim 1, wherein at least a part of the measuring pickup projects into a free space of a cutout on the hydraulic unit and is entirely or partially enclosed by a housing of the control unit.

8. The brake device as claimed in claim 1, wherein a housing of a pump passes entirely or partially through the electronic control unit housing, wherein the housing of the pump and/or the main printed circuit board have/has a through-opening.

9. The brake device as claimed in claim 1, wherein the travel signal generator is a permanent magnet.

10. The brake device as claimed in claim 1, wherein the measuring pickup contains a magnetic core made of a layered material.

11. The brake device as claimed in claim 1, wherein separate digital signal processing electronics are arranged within the measuring pickup or in spatial proximity of the measuring pickup.

\* \* \* \* \*